(12) United States Patent
Miyaoka et al.

(10) Patent No.: US 8,239,525 B2
(45) Date of Patent: Aug. 7, 2012

(54) SERVER APPARATUS AND COMMUNICATION SYSTEM

(75) Inventors: Shinya Miyaoka, Fujimino (JP);
Hiroyuki Fukuoka, Fujimino (JP)

(73) Assignee: KDDI Corporation, Tokyo (JP)

( * ) Notice: Subject to any disclaimer, the term of this patent is extended or adjusted under 35 U.S.C. 154(b) by 323 days.

(21) Appl. No.: 12/393,956

(22) Filed: Feb. 26, 2009

(65) Prior Publication Data

US 2009/0228547 A1     Sep. 10, 2009

(30) Foreign Application Priority Data

Mar. 4, 2008   (JP) .............. P2008-052865

(51) Int. Cl.
*G06F 15/173* (2006.01)
(52) U.S. Cl. ................................ 709/224
(58) Field of Classification Search ............... None
See application file for complete search history.

(56) References Cited

U.S. PATENT DOCUMENTS

| | | | | |
|---|---|---|---|---|
| 5,978,828 A | * | 11/1999 | Greer et al. ............ | 709/224 |
| 6,070,191 A | * | 5/2000 | Narendran et al. ........ | 709/226 |
| 6,484,143 B1 | * | 11/2002 | Swildens et al. .......... | 705/1.1 |
| 2003/0182526 A1 | * | 9/2003 | Mikkelsen et al. ........ | 711/162 |

FOREIGN PATENT DOCUMENTS

| | | |
|---|---|---|
| JP | H10-032648 A | 2/1998 |
| JP | 2000-090128 A | 3/2000 |
| JP | 2003-288314 A | 10/2003 |
| JP | 2006-134108 A | 2/2006 |
| JP | 2008-052865 | 3/2008 |

OTHER PUBLICATIONS

Hiroshi Yoki, "Web Programming 2006", Nikkei Software, Japan, Nikkei Business Publication, Inc., Dec. 24, 2006, vol. 10, No. 2, pp. 118-129.

* cited by examiner

*Primary Examiner* — David England
(74) *Attorney, Agent, or Firm* — Mitchell P. Brook; McKenna Long & Aldridge LLP

(57) ABSTRACT

A client apparatus requests a server apparatus to transmit information. The server apparatus receives the request from the client apparatus, and determines whether a state of an information source satisfies a predetermined condition. The server apparatus, as a result of the determination, if the state of the information source does not satisfy the predetermined condition, suspends a response to the client apparatus, while, if the state of the information source satisfies the predetermined condition, acquires information corresponding to the request from the information source as a response to the client apparatus, and transmits the acquired information to the client apparatus.

4 Claims, 5 Drawing Sheets

SERVER APPARATUS AND COMMUNICATION SYSTEM

BACKGROUND OF THE INVENTION

1. Field of the Invention

The present invention relates to a technology in which a server apparatus acquires information from an information source in response to a request received from a client apparatus, and transmits the acquired information to the client apparatus.

2. Description of the Related Art

In Japanese Patent Application Laid-Open No. H10-032648, a method for automatically updating information of a client/server system is disclosed. In the method for automatically updating information, before a communication call is connected between a client apparatus and a server apparatus, pieces of individual identification information are notified from the client apparatus to the sever apparatus. The server apparatus memorizes records of updated information for the client apparatus. Moreover, the server apparatus determines whether information to be updated for any client is present from among the pieces of individual identification information notified upon an access from the client apparatus, and if it can be determined that no information to be updated is present, suspends connection of a call of telecommunication equipment. Moreover, when communication between the client apparatus and the server apparatus becomes possible, the state is notified from the client apparatus to the sever apparatus, and when service information corresponding to the client apparatus is updated at the side of the server apparatus, the state is notified from the server apparatus to the client apparatus.

Moreover, in Japanese Patent Application Laid-Open No. 2000-090128, an information distribution system is disclosed. In the information distribution system, when any information item is selected as a display target in each of client apparatuses, the information item is registered to a server apparatus. When information of any information item is updated, the server apparatus notifies information reception to a client apparatus which registers the information item, and delivers the received information to the client apparatus, while the client apparatus displays the information item.

A client apparatus, when intending to acquire and display information in real time which is updated irregularly in an information source, needs to execute processing of transmitting a request and receiving a response every given time interval with a sever apparatus. FIG. 5 is a view conceptually illustrating a conventional request/response type communication state. A client apparatus 100 has a client screen 100$a$ and a client communication interface 100$b$, which requests a server apparatus 101 to transmit information (step $S_0 1$). Upon reception of the request from the client apparatus 100, the server apparatus 101 checks an information source 102 holding information whether the information is updated (step $S_1 1$, $S_1 2$). Here, it is assumed that the information in the information source 102 is not updated.

The server apparatus 101, regardless whether the information in the information source 102 is updated or not, instantly responds to the client apparatus (step $S_0 2$) Here, a response indicating that the information in the information source 102 is not updated will be made. If the client apparatus 100 transmits a request to the server apparatus 101 again (step $S_0 3$), the server apparatus 101 checks the information source 102 whether the information is updated (step $S_1 3$, $S_1 4$). Since the information in the information source 102 is not updated yet, the server apparatus 101 instantly transmits a response indicating that the information in the information source 102 is not updated (step $S_0 4$).

Next, as illustrated in FIG. 5, after step $S_1 4$ and at the time of $A_0$, it is assumed that the information in the information source 102 is updated. If the client apparatus 100 transmits a request to the server apparatus 101 again (step $S_0 5$), the server apparatus 101 checks the information source 102 whether the information is updated (step $S_1 5$, $S_1 6$). Since the information in the information source 102 is updated, the server 101 transmits to the client apparatus 100 information indicating that the information in the information source 102 is updated and information corresponding to the request as a response thereto (step $S_0 6$). Thus, in the client apparatus 100, at the time of $B_0$, the updated information can be reflected on the screen.

However, according to the conventional method, difference between timing of updating the information in the information source 102 and timing of transmitting a request from the client apparatus causes a state to occur, in which the client apparatus 100 cannot acquire the updated information in real time. That is, as illustrated in FIG. 5, although the information in the information source 102 is updated at the time of $A_0$, the request from client apparatus 100 will be transmitted after that. Thus, in the client apparatus 100, until the updated information is reflected on the screen, time difference as indicated by an arrow "a" will occur. Since, delay in information acquisition will occur in such a way, in the conventional method, it is difficult for the client apparatus 100 to acquire and display information in real time, which is updated irregularly in the information source 102.

Moreover, although it is not impossible to improve real-time performance by shortening processing time interval of server/client communication processing, shortening the processing time interval causes the number of communications to increase, resulting in increase of a network load.

The present invention is made in view of such circumstances, and an object of the present invention is to provide a server apparatus and a communications system in which a client apparatus can acquire information in real time, which is irregularly updated in an information source.

SUMMARY OF THE INVENTION

A server apparatus of the present invention is characterized in that it acquires information from an information source in response to a request received from a client apparatus and transmits the acquired information to the client apparatus, and it includes: a reception section for receiving a request from the client apparatus; a determination section for determining whether a state of the information source satisfies a predetermined condition; and a transmission section which, if, as a result of the determination, the state of the information source does not satisfy the predetermined condition, suspends a response to the client apparatus, while, if the state of the information source satisfies the predetermined condition, acquires information corresponding to the request from the information source as a response to the client apparatus, and transmits the acquired information to the client apparatus.

Thus, whether the state of the information source satisfies the predetermined condition is determined, and as a result of the determination, if the state of the information source does not satisfy the predetermined condition, since a response to the client apparatus is suspended, it is possible to avoid increase of the number of communications and increase of the network load. Moreover, as a result of the determination, if the state of the information source satisfies the predetermined condition, since the information corresponding to the request is acquired from the information source and the acquired information is transmitted to the client apparatus, delay until the information is reflected on the client apparatus will be eliminated, enabling real-time performance to be enhanced.

Figure 1:
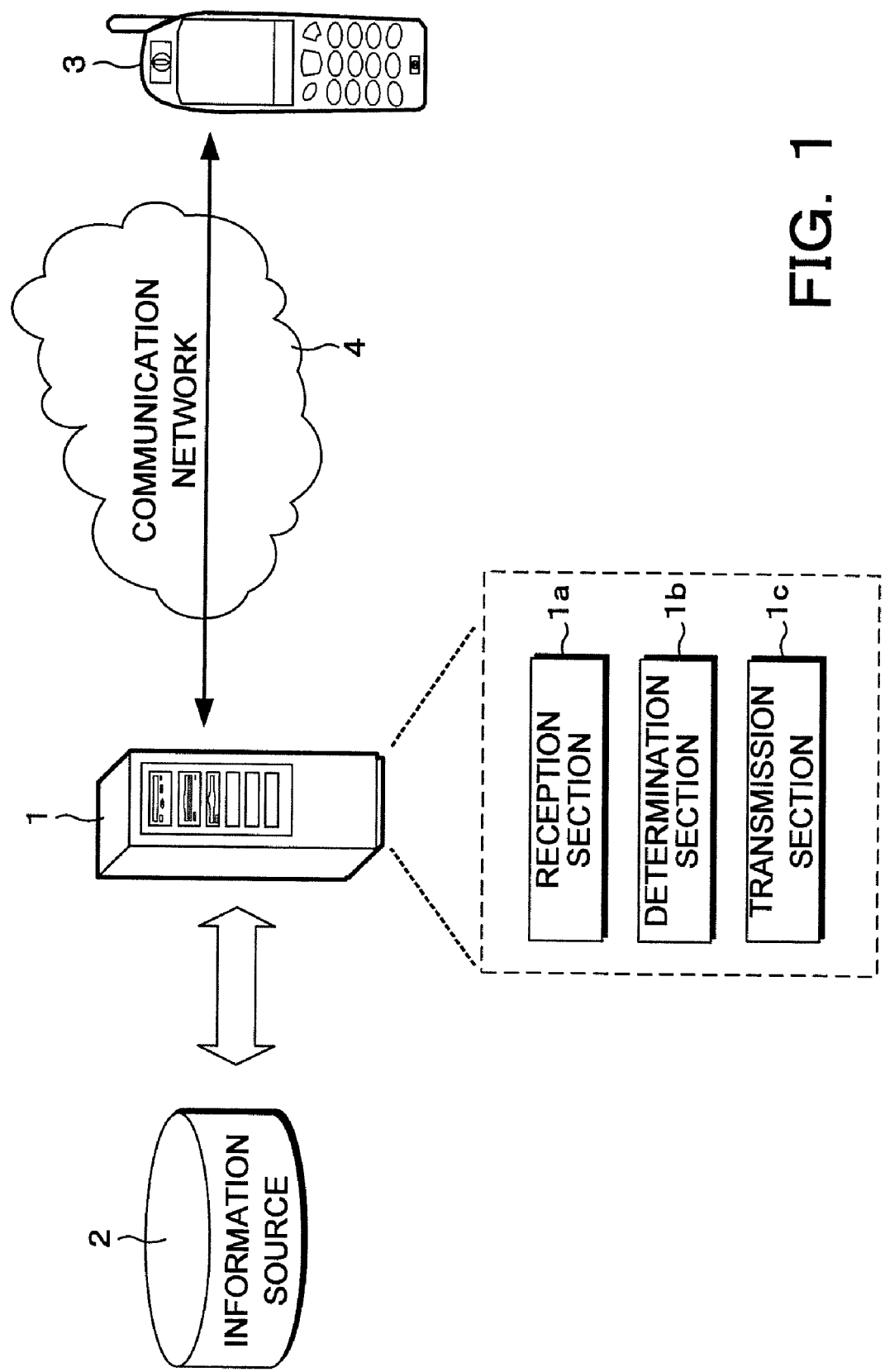
FIG. 1 is a view illustrating a schematic configuration of a real-time character display system according to an embodiment of the present invention.

1 SERVER APPARATUS
1a RECEPTION SECTION
1b DETERMINATION SECTION
1c TRANSMISSION SECTION
2 INFORMATION SOURCE
3 CLIENT APPARATUS
3a SCREEN
3b COMMUNICATION INTERFACE

DETAILED DESCRIPTION OF THE INVENTION

A server apparatus according to the present embodiment is characterized in that it acquires information from an information source in response to a request received from a client apparatus and transmits the acquired information to the client apparatus, and it includes: a reception section for receiving a request from the client apparatus; a determination section for determining whether a state of the information source satisfies a predetermined condition; and a transmission section which, if, as a result of the determination, the state of the information source does not satisfy the predetermined condition, suspends a response to the client apparatus, while, if the state of the information source satisfies the predetermined condition, acquires information corresponding to the request from the information source as a response to the client apparatus, and transmits the acquired information to the client apparatus.

Thus, whether the state of the information source satisfies the predetermined condition is determined, and as a result of the determination, if the state of the information source does not satisfy the predetermined condition, since a response to the client apparatus is suspended, it is possible to avoid increase of the number of communications and increase of the network load. Moreover, as a result of the determination, if the state of the information source satisfies the predetermined condition, since the information corresponding to the request is acquired from the information source and the acquired information is transmitted to the client apparatus, delay until the information is reflected on the client apparatus will be eliminated, enabling real-time performance to be enhanced.

Moreover, the server apparatus according to the present embodiment is characterized in that the determination section determines whether information of the information source is updated; and the transmission section, if, as a result of the determination, information of the information source is not updated, suspends a response to the client apparatus, while, if the state of the information source is updated, acquires information corresponding to the request from the information source as a response to the client apparatus, and transmits the acquired information to the client apparatus.

Thus, whether the information of the information source is updated is determined, and as a result of the determination, if the information of information source is not updated, since a response to the client apparatus is suspended, it is possible to avoid increase of the number of communications and the network load. Moreover, as a result of the determination, if the information of the information source is updated, since the information corresponding to the request from the information source is acquired and the acquired information is transmitted to the client apparatus, delay until the information is reflected on the client apparatus will be eliminated, enabling the real-time performance to be enhanced.

Moreover, the server apparatus according to the present embodiment is characterized in that the transmission section, when, as a result of the determination, information of the information source is not updated, suspends a response to the client apparatus until a predetermined time elapses, and, when the predetermined time elapses, transmits information indicating that the information corresponding to the request is not updated to the client apparatus as a response to the client apparatus.

Thus, as a result of the determination, if information of an information source is not updated, since a response to the client apparatus is suspended until a predetermined time elapses, it is possible to avoid increase of the number of communications and the network load. Moreover, when the predetermined time elapses, since information indicating that the information corresponding to the request is not updated, is transmitted to the client apparatus, as a response to the client apparatus, it is possible to notify the client apparatus that last request is made invalid. Thus, in the client apparatus, it is possible to suspend processing started by the last request and to start request processing again.

Moreover, a communication system according to the present embodiment is characterized in that it includes a server apparatus and a client apparatus; the server apparatus acquires information from an information source in response to a request received from the client apparatus, and transmits the acquired information to the client apparatus, wherein the client apparatus requests the server apparatus to transmit information; and the server apparatus receives the request from the client apparatus to determine whether a state of the information source satisfies a predetermined condition, and, as a result of the determination, if the state of the information source does not satisfy the predetermined condition, suspends a response to the client apparatus, while, if the state of the information source satisfies the predetermined condition, acquires information corresponding to the request from the information source as a response to the client apparatus and transmits the acquired information to the client apparatus.

Thus, whether the state of an information source satisfies a predetermined condition is determined, and as a result of the determination, if the state of the information source does not satisfy the predetermined condition, a response to a client apparatus is suspended, and thereby, it is possible to avoid increase of the number of communications and the network load. Moreover, as a result of the determination, if the sate of the information source satisfies the predetermined condition, information corresponding to the request is acquired from the information source, and the acquired information is transmitted to the client apparatus, and thereby, delay until the information is reflected on the client apparatus will be eliminated, enabling the real-time performance to be enhanced.

Moreover, the communication system according to the present embodiment is characterized in that the server apparatus determines whether the information of the information source is updated, and, as a result of the determination, if the information of the information source is not updated, suspends a response to the client apparatus, while, if the information of the information source is updated, acquires information corresponding to the request from the information source as a response to the client apparatus and transmits the acquired information to the client apparatus.

Thus, whether the information in the information source is updated is determined, and as a result of the determination, if the information in the information source is not updated, a response to the client apparatus is suspended, and thereby, it is possible to avoid increase of the number of communications and the network load. Moreover, as a result of the determination, if the information in the information source is updated, the information corresponding to a request is acquired from the information source, and the acquired information is transmitted to the client apparatus, and thereby, delay until the updated information is reflected on the client apparatus is eliminated, enabling real-time performance to be enhanced.

Moreover, the communication system according to the present embodiment is characterized in that the server apparatus, as a result of the determination, if the information of the information source is not updated, suspends a response to the client apparatus until a predetermined time elapses, and, if the predetermined time elapses, transmits information indicating that the information corresponding to the request is not updated, to the client apparatus as a response to the client apparatus; while, the client apparatus, after transmitting the request, suspends transmission of a request until a predetermined time elapses, and, when the predetermined time elapses, transmits a request again.

Thus, as a result of the determination, if the information in the information source is not updated, a response to the client apparatus is suspended until predetermined time elapses, and thereby, it is possible to avoid increase of the number of communications and the network load. Moreover, when the predetermined time elapses, information indicating that the information corresponding to the request is not updated, is transmitted to the client apparatus as a response to the client apparatus, and thereby, it is possible to notify the client apparatus that last request is made invalid. Thus, it is possible for the client apparatus to suspend processing started by the last request and to start request processing again.

According to the present embodiment, whether a state of an information source satisfies a predetermined condition is determined, and as a result of the determination, if the state of the information source does not satisfy the predetermined condition, a response to the client apparatus is suspended, and thereby, it is possible to avoid increase of the number of communications and the network load. Moreover, as a result of the determination, if the state of the information source satisfies the predetermined condition, the information corresponding to a request is acquired from the information source, and the acquired information is transmitted to the client apparatus, and thereby, delay until the information is reflected on the client apparatus is eliminated, enabling the real-time performance to be enhanced.

BEST MODES FOR CARRYING OUT THE INVENTION

Next, an embodiment according to the present invention will be described with reference to drawings. In the present embodiment, an example is described, in which the present invention is applied for a real-time character display system. The real-time character display system is a system in which, in lecture meeting, seminar, lecture, or the like, lecture contents and related information are transmitted to a mobile phone and displayed on the screen of the mobile phone simultaneously.

FIG. 1 is a view illustrating a schematic configuration of the real-time character display system according to the present embodiment. The communication system includes: a server apparatus 1 for controlling whole of the system; an information source 2 for storing information and updating the information; and a client apparatus 3, for example, a mobile phone. The server apparatus 1, in response to a request received from the client apparatus 3, acquires information from the information source 2, and transmits the acquired information to the client apparatus 3. The server apparatus 1 receives the request from the client apparatus at a reception section 1a.

A determination section 1b determines whether a state of the information source 2 satisfies a predetermined condition. Here, in the present embodiment, it is assumed that the predetermined condition is defined as, for example, update of the information of the information source 2. If the determination section 1b determines that the information of the information source 2 is not updated, the transmission section 1c suspends a response to the client apparatus 3 until a predetermined time elapses. While, if the information of the information source 2 is updated, the transmission section 1c acquires information corresponding to the request from the information source 2 as a response to the client apparatus 3, and transmits the acquired information to the client apparatus 3.

Figure 2:
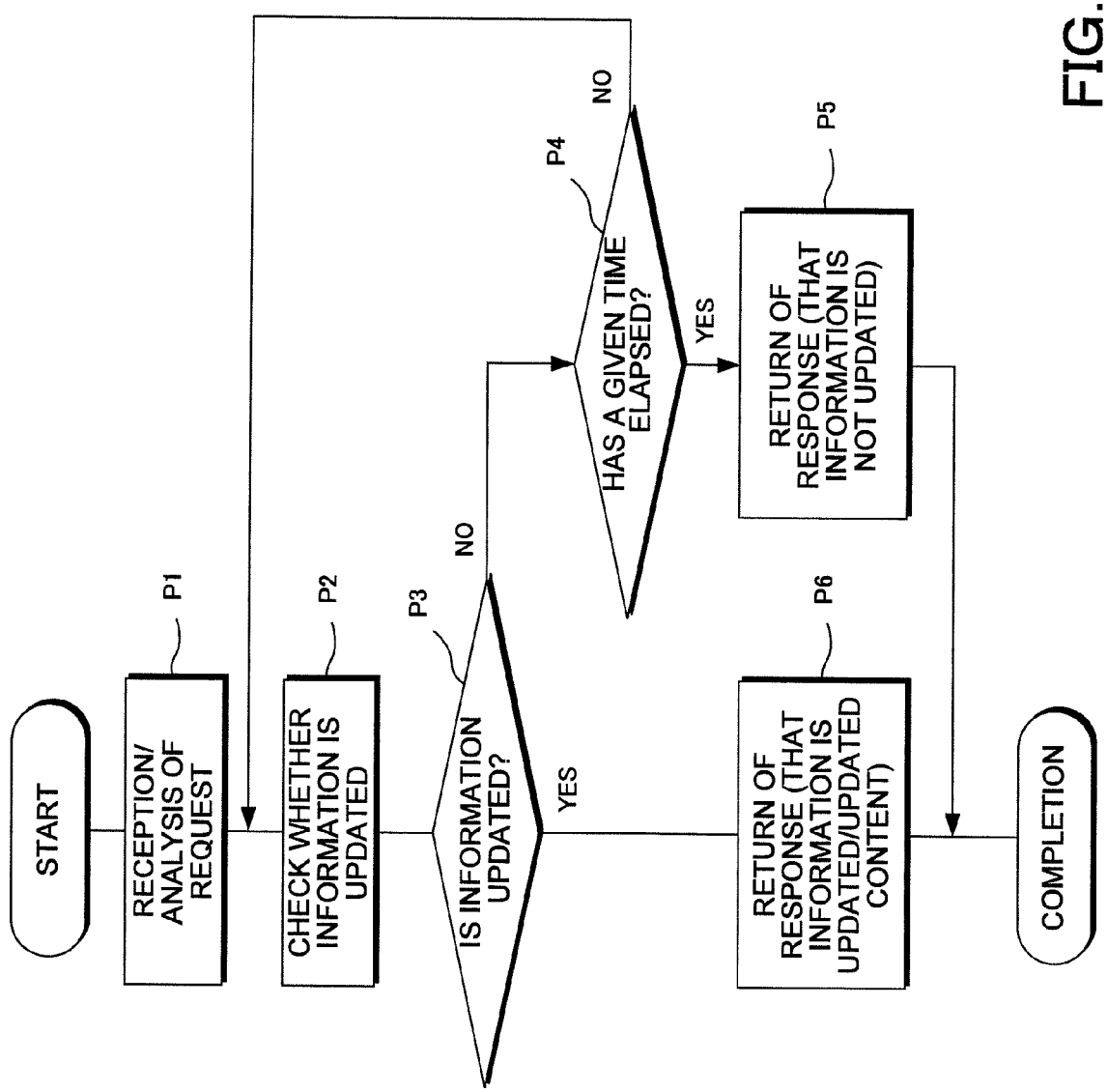
FIG. 2 is a flow chart illustrating an operation of a server apparatus of the embodiment according to the present invention.
Figure 3:
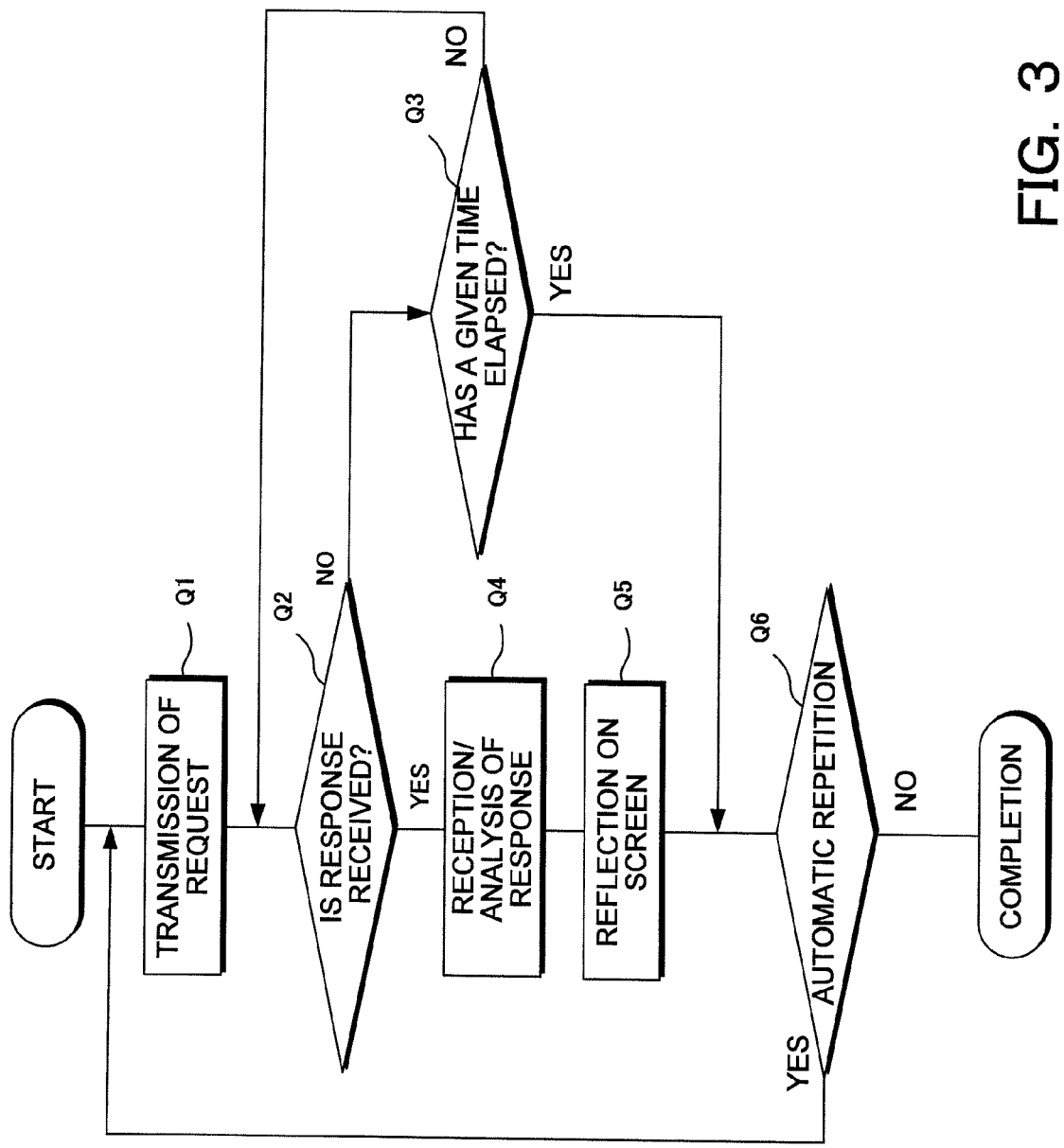
FIG. 3 is a flow chart illustrating an operation of a client apparatus of the embodiment according to the present invention.

Next, operations of the server apparatus and the client apparatus of the above constituted real-time character display system according to the present embodiment, will be described. FIG. 2 is a flowchart illustrating the operation of the server apparatus according to the present embodiment, and FIG. 3 is a flowchart illustrating the operation of the client apparatus according to the present embodiment. First, a user of the client apparatus sets an attending lecture ID in advance. The user manipulates the client apparatus to execute request transmission illustrated in FIG. 3 (step Q1). Function of the request transmission is to acquire the lecture ID, the number of acquired data bytes, and a time-out time memorized by the client apparatus and to start processing at the server apparatus.

In FIG. 2, the server apparatus, upon receiving a request, analyzes contents and parameter values of the request (step P1). Next, the server apparatus checks update of the information of the information source 2 (step P2), compares the size of lecture data indicated by the lecture ID and the number of acquired data bytes (step P3), and if the number of data bytes is equal to or more than the size of the lecture data, determines whether a given time has elapsed, that is, whether a time-out has occurred (step P4). Here, the given time for monitoring is set within the time-out time acquired from the request parameters.

At step P4, when the given time has not elapsed, operation transits to step P2, while, when the given time has elapsed, information indicating that the information of the information source is not updated, are returned to the client apparatus as a response thereto (step P5), and operation is completed. At step P3, if the information of the information source is updated, information indicating that the information of the information source is updated and information indicating the updated content, is returned to the client apparatus as a response thereto (step P6), and operation is completed.

Meantime, in FIG. 3, the client apparatus transmits a request (step Q1), and then determines whether a response is received from the server apparatus (step Q2). If a response is not received from the server apparatus, the client apparatus determines whether a given time has elapsed (step Q3), and when the given time has not elapsed, operation transits to step Q2, while, when the given time has elapsed at step Q3, operation transits to step Q6.

At step Q2, if a response is received from the server apparatus, contents of the received response are analyzed (step Q4). Here, if data of updated information is contained in the response, the display on the screen is updated to reflect the updated information (step Q5), while, if data of updated information is not contained in the response, no operation is performed. Next, whether an automatic repeating operation is performed is determined (step Q6), and, if the automatic repeating operation is performed, operation transits to step Q1, while, if the automatic repeating operation is not performed, operation is completed.

Figure 4:
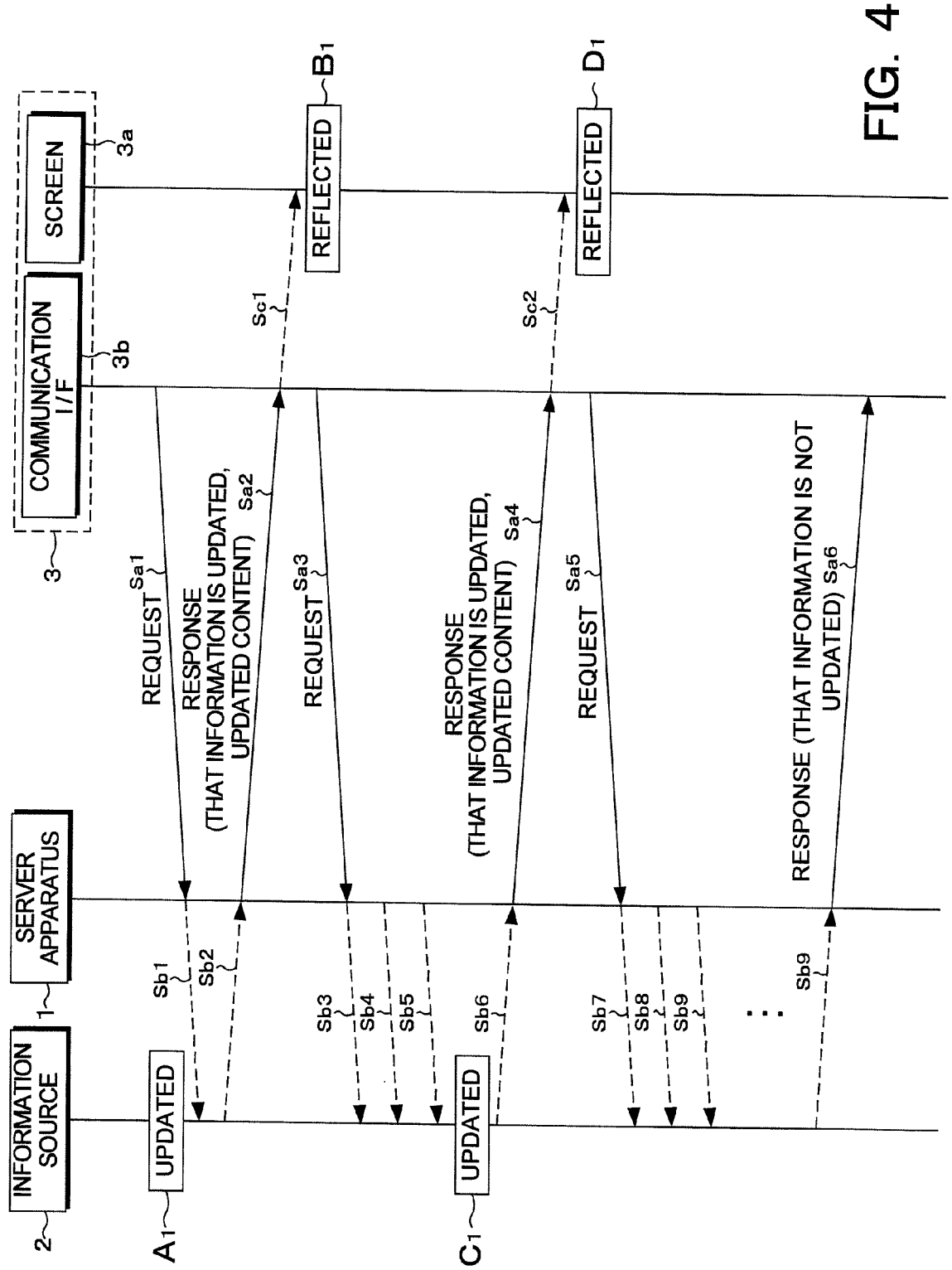
FIG. 4 is a sequence chart illustrating whole of the operations of the real-time character display system according to the embodiment of the present invention.
Figure 5:
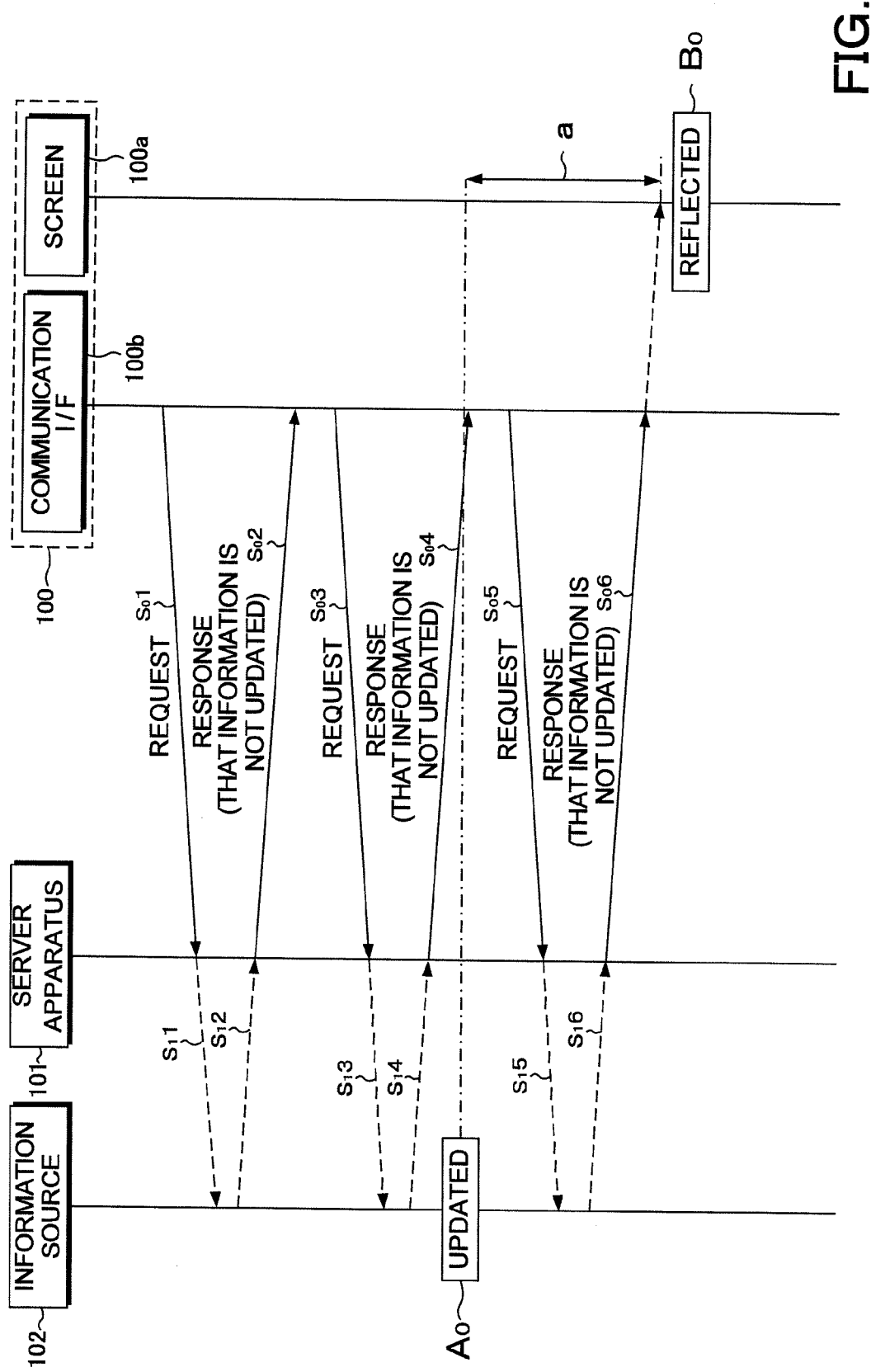
FIG. 5 is a view conceptually illustrating a conventional request/response type communication state.

FIG. 4 is a sequence chart illustrating whole of the operations of the real-time character display system according to the present embodiment. The client apparatus 3 can display an image on a screen 3a, and communicate with the server apparatus 1 through a communication interface 3b. If the client apparatus 3 transmits a request to the server apparatus 1 through the communication interface 3b (step $S_a1$), the server apparatus 1 determines whether information is updated in the information source 2 ((step $S_b1$, $S_b2$). Here, at the time of $A_1$, the information in the information source 2 is updated, and thereby the server apparatus 1 immediately acquires updated information from the information source 2 as a response and transmits information indicating that updating is done and the updated information to the client apparatus (step $S_a2$). In the client apparatus 3, on reception of the information indicating that updating is done and the updated information, the updated information can be reflected on the screen 3a at the time of $B_1$ (step $S_c1$).

Next, if the client apparatus 3 transmits a request to the server apparatus 1 (step $S_a3$), the server apparatus 1 determines whether information is updated in the information source 2 (step $S_b3$). Here, the information in the information source 2 is not updated. Thus, the server apparatus 1 repeatedly determines whether information is updated in the information source 2 (steps $S_b4$ and $S_b5$). Here, since it is within a set time-out time, the server apparatus 1 does not transmit a response to the client apparatus 3.

Next, if the information in the information source 2 is updated at the time of $C_1$, the server apparatus 1 immediately acquires the updated information from the information source 2 and transmits information indicating that updating is made and the updated information to the client apparatus as a response thereto (step $S_a4$). In the client apparatus 3, on reception of the information indicating that updating is made and the updated information, the updated information can be reflected on the screen 3a at the time of $D_1$ (step $S_c2$).

Next, if the client apparatus 3 transmits a request to the server apparatus 1 (step $S_a5$), the server apparatus 1 determines whether information is updated in the information source 2 (step $S_b7$). Here, the information in the information source 2 is not updated. Thus, the server apparatus 1 repeatedly determines whether information is updated in the information source 2 (steps $S_b8$ and $S_b9$). Here, since the set time-out time has elapsed, the server apparatus 1 transmits information indicating that updating is not made to the client apparatus 3 as a response thereto (step $S_a6$).

In addition, a given time period while the server apparatus suspends a transmission of the response, that is a time until a time-out time elapses, can be determined as follows. First, there are methods for setting the time-out time between the server apparatus and the client apparatus in advance. In these methods, a method for determining the time-out time off-line in advance, and a method for setting the time-out time by the client apparatus on-line on a client registering page managed by the server apparatus may be adopted. Moreover, it is also possible to set a time-out time by a method in which the time-out time is investigated and learned by trying a plurality of communications between a server apparatus and a client apparatus. Specifically, by executing request processing with different time-out times, the maximum value of the time-out times is obtained, at which the time-out does not occur. Then, based on the maximum value, an optimum value (slightly smaller than the maximum value) is used as the optimum time-out time. At that time, a CGI (Common Gateway Interface) is provided to the server apparatus, which suspends a response until the entire time-out time has elapsed, regardless of the information updating processing.

Moreover, there is also an approach in which, if time-out will occur by executing request processing, the time-out time is changed to a smaller value, on the contrary, if time-out will not occur, the time-out time is changed to a larger value. Thus, a dynamic control can be performed, in which upper limit and lower limit are provided. Moreover, based on the past record, the optimum value of the time-out time can also be determined.

Next, there is a method in which the client apparatus notifies information to the server apparatus for each communication. Examples of the contents of the notified information are a time-out time, a classification ID of the client apparatus (when the server apparatus grasps the time-out time for every client classification ID), or a client identification ID (when the server apparatus grasps the time-out time for every client identification ID).

Moreover, methods in which the server apparatus 1 determines whether the information of the information source 2 is updated, include the following methods. A first one is a method in which the client apparatus records the last communication content, and, when it transmits a request, notifies the recorded content to the client apparatus, and the server apparatus determines whether information is updated. In this case, examples of the contents recorded by the client apparatus are URL to be a target and the number of received data bytes. These can be used when information is updated additionally. Moreover, the contents may include URL to be a target and a time of last communication. These can be used when information itself is changed greatly.

Next one is an approach in which the server apparatus records last communication contents, and, based on the contents, determines whether information is updated. In this case, examples of the contents recorded by the server apparatus include the client identification ID and the number of transmitted data bytes. These can be used when information is updated additionally. Moreover, the contents may include the client identification ID and the time of last communication. These can be used when information itself is changed greatly. Further, a method can also be adopted, in which both of the client apparatus and the server apparatus record last communication contents.

Further, in order to set a predetermined condition, the following methods can be adopted. Namely, a method can be adopted, in which the condition is set by determining it off-line, and a method in which the condition is set on-line on a client registering page managed by the server apparatus 1. Moreover, the condition may be notified from the client apparatus 3 to the server apparatus 1 for each communication.

Examples of contents of the condition to be set may be defined as, for example, in a real-time character display system, the number of additional characters in lecture caption becoming equal to or more than a given value, and the observation value exceeding a specified threshold value. Moreover, when the present invention is applied to a system for monitoring stock prices, the contents of the condition may be defined as a specific stock becoming equal to or greater than a given price, or the fluctuation range becoming equal to or greater than a given value from the last reference time. According to the present invention, the contents of the condition may be defined as significant fluctuation occurring in the information source 2, as well as setting to neglect slight fluctuation in the information source 2.

The present invention is applicable for systems in which information to be updated irregularly is displayed on a mobile phone in real time. The systems are, for example, the above mentioned system for providing the contents of lecture and speech in characters, a system for providing simultaneous translations of a plurality of languages in information of characters, a system for remotely monitoring an image of a camera or processing state of a apparatus, and a system for message board, chat, and auction on WEB. In each of the systems, by monitoring a predetermined condition, for example, the information is updated, suspending a response of the server apparatus to the client apparatus until the information is updated, and, when the information is updated, transmitting the response of the server apparatus to the client apparatus, the updated information can be provided in real time.

As mentioned above, according to the present embodiment, since the server apparatus 1, when the information in the information source is not updated, suspends a response to the client apparatus until a predetermined time elapses, it is possible to avoid increase of the number of communications and the network load. Moreover, since the server apparatus 1, when the predetermined time has elapsed, transmits information indicating that the information corresponding to a request is not updated, to the client apparatus as a response thereto, it is possible to notify the client apparatus that last request is made invalid. Thus, in the client apparatus, it is possible to suspend processing started by the last request and to start request processing again.

What is claimed is:

1. A server apparatus which acquires information from an information source in response to a request received from a client apparatus and transmits the acquired information to said client apparatus, comprising:
a reception section for receiving a request from said client apparatus;
a determination section for determining whether a state of said information source satisfies a predetermined condition using last communication contents; and
a transmission section which, if, as a result of said determination, the state of said information source does not satisfy the predetermined condition, suspends a response to said client apparatus, while, if the state of said information source satisfies the predetermined condition, acquires information corresponding to said request from said information source as a response to said client apparatus, and transmits the acquired information to said client apparatus;
wherein said determination section repeatedly determines whether information of said information source is updated by transmitting a plurality of communications between the server apparatus and the information source; and
said transmission section, when, as a result of said determination, information of said information source is not updated, suspends a response to said client apparatus until a set time elapses, and when the set time elapses, transmits information indicating that the information corresponding to said request is not updated to said client apparatus as a response to said client apparatus.

2. The server apparatus according to claim 1, wherein said transmission section, if, as a result of said determination, information of said information source is not updated, suspends a response to said client apparatus, while, if the state of said information source is updated, acquires information corresponding to said request from said information source as a response to said client apparatus, and transmits the acquired information to said client apparatus.

3. A communication system including a server apparatus and a client apparatus; said server apparatus acquires information from an information source in response to a request received from said client apparatus, and transmits the acquired information to said client apparatus,
said client apparatus requesting said server apparatus to transmit information; and
said server apparatus receiving the request from said client apparatus to determine whether a state of said information source satisfies a predetermined condition using last communication contents, and, as a result of said determination, if the state of said information source does not satisfy the predetermined condition, suspending a response to said client apparatus, while, if the state of said information source satisfies the predetermined condition, acquiring information corresponding to said request from said information source as a response to said client apparatus and transmitting the acquired information to said client apparatus;
wherein said server apparatus repeatedly determines whether the information of said information source is updated by transmitting a plurality of communications between the server apparatus and the information source, as a result of said determination, if the information of said information source is not updated, suspends a response to said client apparatus until a set time elapses, and if the set time elapses, transmits information indicating that the information corresponding to said request is not updated, to said client apparatus as a response to said client apparatus; while
said client apparatus, after transmitting said request, suspends transmission of a request until the set time elapses, and, when the predetermined time elapse, transmits a request again.

4. The communication system according to claim 3, wherein said server apparatus as a result of said determination, if the information of said information source is not updated, suspends a response to said client apparatus, while, if the information of said information source is updated, acquires information corresponding to said request from said information source as a response to said client apparatus and transmits the acquired information to said client apparatus.

* * * * *